(No Model.)
W. A. BENNETT.
COLLAR FASTENER.
No. 442,215.　　　　　　　　Patented Dec. 9, 1890.
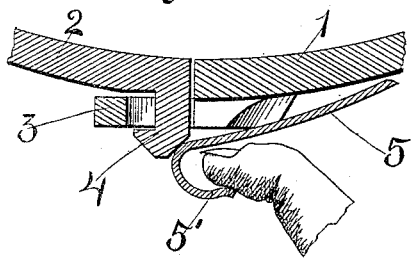
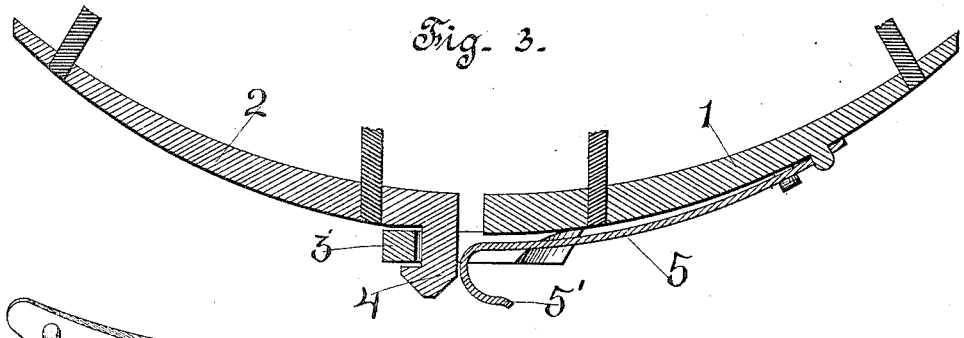
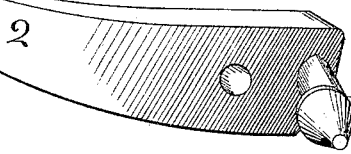
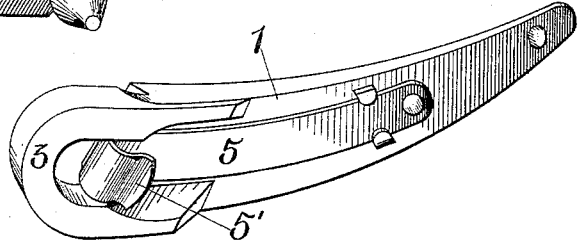
WITNESSES:
Charles D. Epling
S. G. Haller
William A. Bennett
INVENTOR
BY Lon. Vaughan
ATTORNEY

United States Patent Office.

WILLIAM A. BENNETT, OF BLAIR, NEBRASKA.

COLLAR-FASTENER.

SPECIFICATION forming part of Letters Patent No. 442,215, dated December 9, 1890.

Application filed April 28, 1890. Serial No. 349,828. (No model.)

*To all whom it may concern:*

Be it known that I, WILLIAM A. BENNETT, a citizen of the United States, residing at Blair, in the county of Washington and State of Nebraska, have invented a new and useful Collar-Fastener, of which the following is a specification.

My invention relates to improvements in collar-fasteners used to separably lock together the halves of a separable throat horse-collar; and the objects of my invention are, first, to provide a good fastener of the least possible number of simply-constructed parts, and, second, to provide a fastener that will be self-locking and easy to couple or uncouple. I attain these objects by the mechanism illustrated in the accompanying drawings, in which—

Figures 1 and 2 are perspective views of the two parts of the fastener uncoupled. Fig. 3 is a longitudinal central section of the fastener when coupled. Fig. 4 is a similar section illustrating the manner of uncoupling the parts.

Similar numerals refer to similar parts throughout the several views.

Parts 1 and 2 are designed to fit in the groove of the collar between the belly and the rim, on the lower periphery, at the throat—a part attached to each of the halves in the usual manner. Part 2 is provided at its joint or outer end with a rigid hook 4, the shank of which projects directly outward from or being directly or substantially at a right angle to the body of the said part. Part 1 has at its end a loop 3, and on its outer face a spring or elastic tongue 5, the free end of which extends into but not across the space of the said loop. The rigid hook 4 is of proper size to be entered into the space of the loop 3 from the back by forcing the spring-tongue outward until the hook proper passes beyond the loop 3 of the part 1, when the said loop, falling back into the space of the hook, will permit the spring-tongue 5 to spring back into place behind the shank of the hook, and by abutting against the back of the said hook will hold the parts coupled together.

The manner of uncoupling the parts is illustrated in Fig. 4, by catching a finger in the curved portion 5' and bending the free end of the tongue downward until the hook can be disengaged and withdrawn from the loop 3. In coupling, the hook 4 is thrust downward or outward into the space of the loop against the tongue, bending it sufficient to let the lower part of the hook pass through and engage the loop. The end of the elastic tongue then returns, so as to abut against the back of the hook, locking it in the loop.

Having fully described my invention, what I claim, and desire to secure by Letters Patent, is—

1. A horse-collar fastener consisting of the part 1, having the loop 3 at its end and on its outer face the spring-tongue 5, the outer end of which extends into but not across the space of the said loop, combined with the part 2, provided at its end with the rigid hook 4, projecting directly outward therefrom, whereby when the said parts are coupled together the said spring-tongue will abut against the back of the said hook and prevent disengagement of the said parts, substantially as set forth.

2. A horse-collar fastener consisting of the part 1, having the loop 3 at its end, and the spring-tongue 5, the outer end of which extends into but not across the space of the said loop, said tongue having the curved portion 5', combined with the part 2, provided at its end with the rigid hook 4, projecting outward therefrom, and behind which the said spring-tongue abuts when the parts are coupled together, substantially as set forth.

WILLIAM A. BENNETT.

Witnesses:
EDGAR A. STEWART,
E. CASTETTER.